United States Patent [19]
Phillips

[11] Patent Number: 5,311,906
[45] Date of Patent: May 17, 1994

[54] PRELOAD MECHANISM FOR POWER STEERING APPARATUS

[75] Inventor: Edward H. Phillips, Troy, Mich.

[73] Assignee: Techco Corporation, Troy, Mich.

[21] Appl. No.: 923,380

[22] Filed: Jul. 31, 1992

Related U.S. Application Data

[63] Continuation-in-part of Ser. No. 828,659, Feb. 4, 1992.

[51] Int. Cl.$^5$ ............................................... F15B 9/08
[52] U.S. Cl. ............................. 137/625.23; 91/375 A; 137/625.24
[58] Field of Search .......... 137/625.2, 625.22, 625.23, 137/625.24; 91/375 A, 375 R

[56] References Cited

U.S. PATENT DOCUMENTS

| | | | |
|---|---|---|---|
| 4,415,002 | 11/1983 | Taig | 137/625.23 |
| 4,449,601 | 5/1984 | Adams | 137/625.24 X |
| 4,672,884 | 6/1987 | Rosell | 137/625.21 X |
| 4,770,081 | 9/1988 | Kita | 137/625.65 X |
| 4,823,839 | 4/1989 | Rayner | 137/625.24 |

*Primary Examiner*—Gerald A. Michalsky
*Attorney, Agent, or Firm*—Gifford, Groh, Sprinkle, Patmore and Anderson

[57] ABSTRACT

A preload mechanism for use in a rotary control valve is disclosed. The preload mechanism mechanically interlocks input and output members of the control valve to inhibit relative rotation therebetween when steering torque applied to the input member is below a predetermined preload level. The preload mechanism includes a tension spring ring having at least one pair of elongated slots. Pins secured to each of the input and output members project through and are retained in the slots in an over-constrained manner whereby the preload force is bi-directionally exerted on both of the pins.

9 Claims, 6 Drawing Sheets

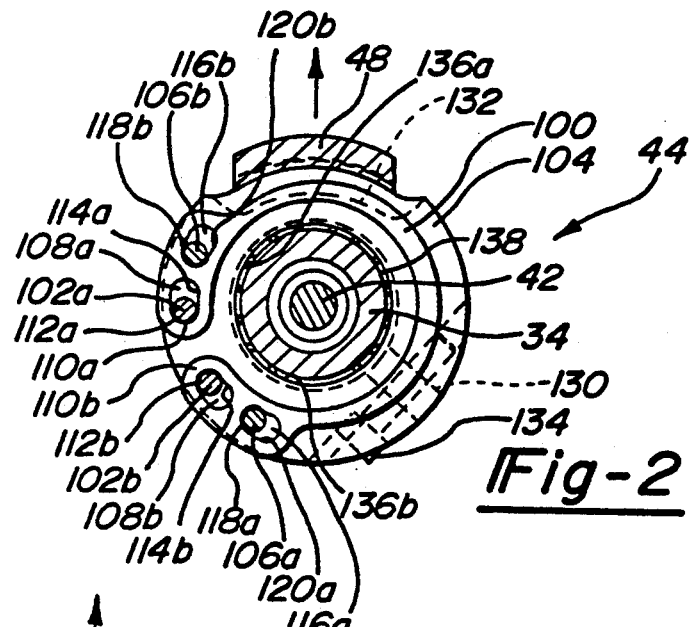
Fig-2
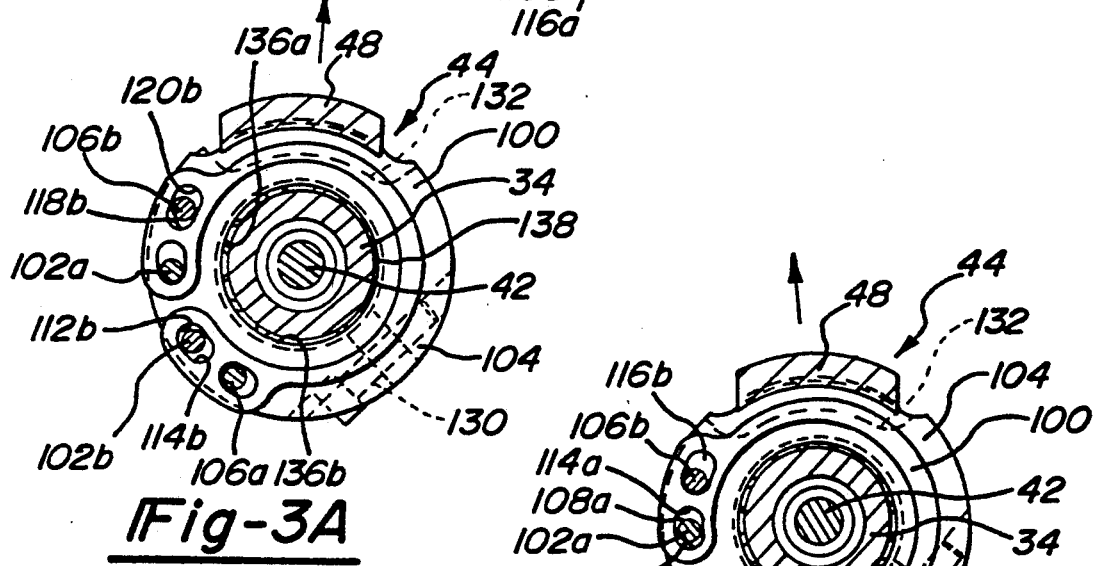
Fig-3A
Fig-3B
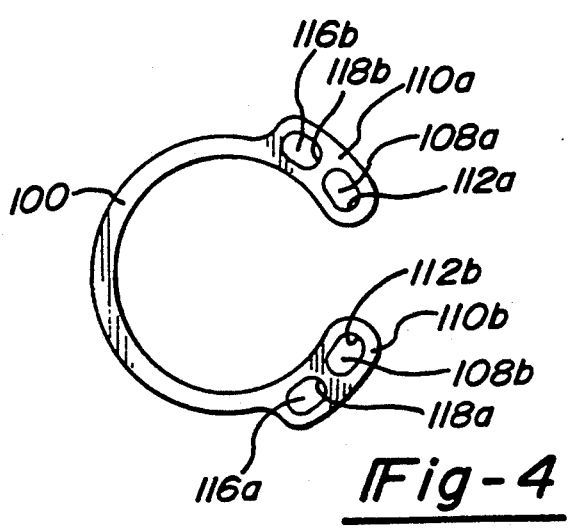
Fig-4

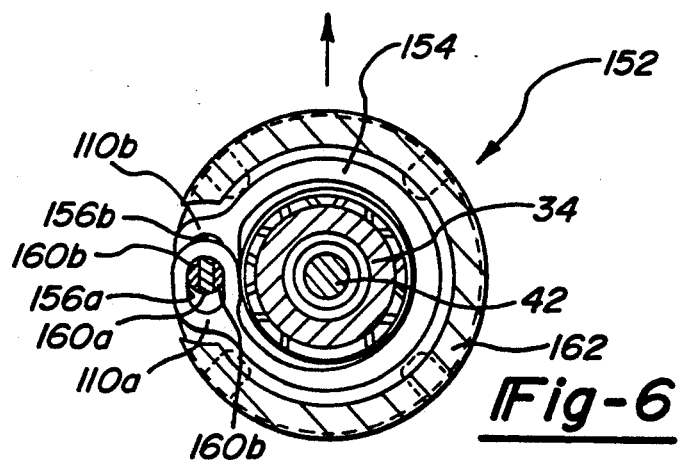
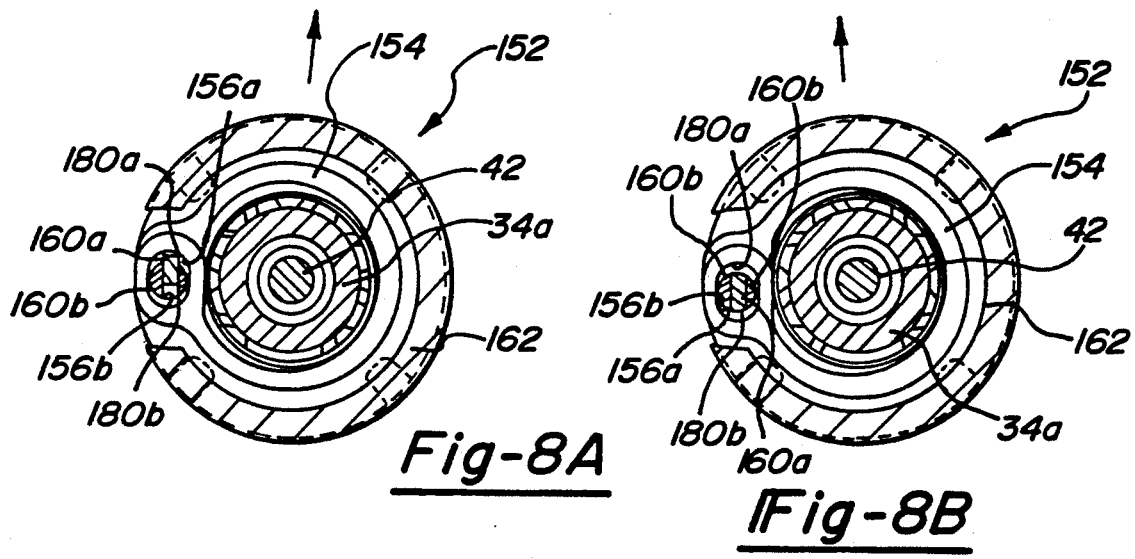
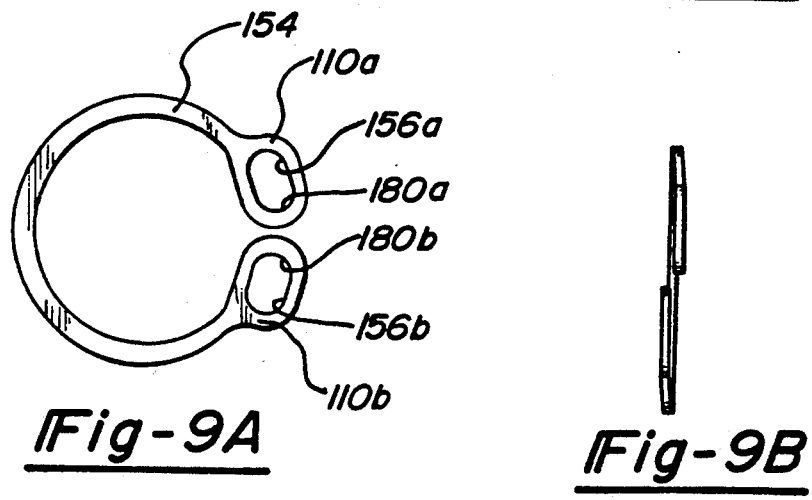

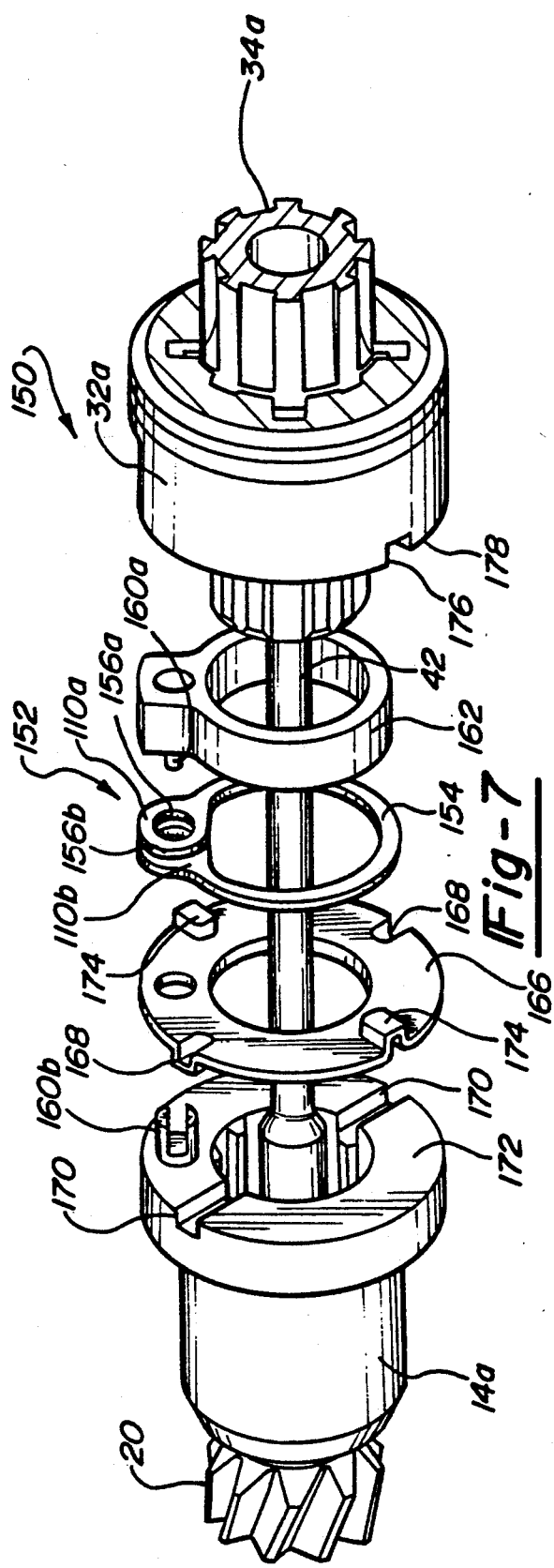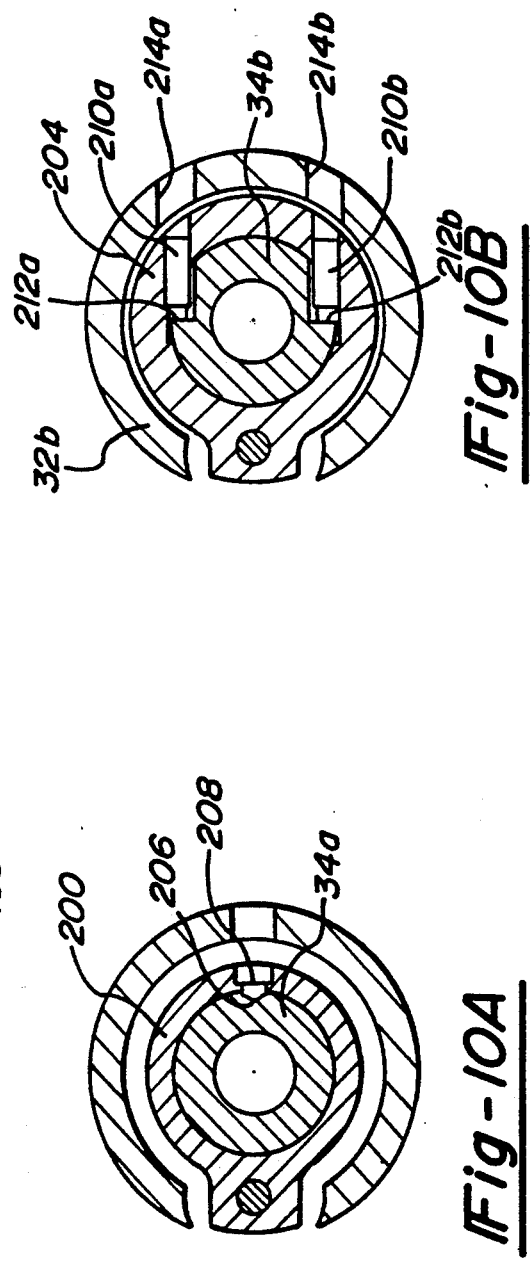

PRELOAD MECHANISM FOR POWER STEERING APPARATUS

CROSS REFERENCE TO RELATED APPLICATIONS

The present application is a continuation-in-part of U.S. Ser. No. 07/828,659 filed Feb. 4, 1992 and entitled "PRELOAD MECHANISM FOR POWER STEERING APPARATUS".

BACKGROUND OF THE INVENTION

The present invention relates generally to a rotary control valve wherein relative rotation between a valve sleeve and a valve spool received therein effectively controls fluid distribution and fluid pressure from a pump to opposite ends of a hydraulic actuator. More particularly, the present invention is directed to incorporation of a preload mechanism into the rotary control valve for enhancing "on-center" feel in vehicular power steering systems. The preload mechanism functions to mechanically interlock the valve sleeve and valve spool of the power steering control apparatus for inhibiting relative rotation therebetween so as to increase tactile reactions to steering inputs at low levels of steering wheel input torque.

For efficient operation of rotary control valve, it is desirable that the control valve be correctly set-up ("balanced") when in its neutral or "centered" condition. Accordingly, the preload mechanism should be operable to rotationally bias the spool and sleeve relative to each other and to the neutral condition in which condition fluid flow, if any, through the control valve presents balanced characteristics. Most rotary control valves used in power-assisted vehicular steering systems provide open-center characteristics in the neutral condition such that a supply of fluid under pressure to an inlet port of the control valve provides pressure drops which are "balanced" across its outlet ports which are in fluid communication with opposite sides of the hydraulic power cylinder and to a fluid return system.

In most conventional vehicular power steering systems, the power steering control apparatus is equipped with a rotary control valve wherein relative rotation between the valve spool and valve sleeve from the centered position in response to steering input torque operates to control the degree of hydraulic power-assist provided. It is known in the power steering art to use a preload device for facilitating improvements in the tactile reaction to low level steering inputs. In general, preload devices function to return the rotary control valve to its centered position upon removal of input torque as well as for inhibiting relative rotative between the valve spool and valve sleeve in response to input torques below an over-ride or preload threshold. As such, at input torque levels below the preload threshold value, the power steering system functions substantially similar to a manual mechanical steering system.

One type of preload mechanism used in power steering systems is commonly referred to as an over-ride detent device. While such over-ride detent devices are typically capable of achieving the required preload requirements, they are often subject to undesirable Coulomb friction resulting in excessive hysteresis of the over-ride threshold. Other known preload mechanism mecan be generally classified as spring-loaded devices. For example, U.S. Pat. No. 4,823,839 discloses a device wherein a C-shaped compression spring is fixed to the valve sleeve. A first abutment secured to the valve spool is located within a mouth portion of the compression spring while a second abutment secured to the valve sleeve is also located within the mouth portion. Upon application of a steering torque exceeding the preload of the compression spring, relative rotation between the valve spool and valve sleeve occurs wherein the abutments react in opposite directions against the mouth portion of the compression spring for exerting a tensile force thereon. This tensile force tends to enlarge the mouth portion of the compression spring. Unfortunately, to avoid lateral "buckling" of the C-spring in response to such enlargement or "camming-open" the mouth portion, the compression spring must be guided through such motion which results in excessive friction and unwanted hysteresis.

SUMMARY OF THE INVENTION

Accordingly, a primary object of the present invention is to provide a control apparatus for a vehicular power steering system having a four-way rotary control valve equipped with an improved preload mechanism which is designed to overcome the disadvantages associated with conventional preload devices.

As a related object, the present invention is directed to a preload mechanism having a tension spring designed to eliminate the use of hysteresis generating guides.

Accordingly, a first preferred embodiment of the improved preload mechanism includes a C-shaped tension spring ring having first and second pairs of elongated contoured slots within which first and second pairs of pins, respectively, are retained. The first pair of pins are mechanically linked to one of the input and output members of the control apparatus while the second pair of pins are mechanically linked to the other thereof. The C-shaped tension spring ring is designed such that it must be compressed for permitting entry of the first and second sets of pins into their respective first and second elongated slots for exerting a preload thereon. In operation, relative motion between the first and second pairs of pins and, in turn, the input and output members is inhibited until sufficient input torque is applied to the input member for overcoming the preload of the tension spring ring. Once the preload exerted by the tension spring ring on the first and second pairs of pins is overcome, relative motion between the input and output members of the power steering control apparatus permits fluid distribution through the rotary control valve in a conventional manner. When such relative motion occurs, the tangential force generated between one of the first pair of pins and an opposing one of the second pair of pins is applied to the tension spring ring as a compressive force while the remaining ones of the first and second pairs of pins move without restriction in their respective elongated slots. Furthermore, following removal of the input torque, the preload of the tension spring ring acts on the pins for effectively biasing the input and output members to their centered interlocked position.

In accordance with an alternative preferred embodiment, the tension spring ring has overlapping and partially alignable first and second elongated slots that are interleaved upon first and second pin sectors for mechanically linking the input and output members, respectively, of the power steering control apparatus. Again, the tension spring ring is designed such that it must be initially compressed for positioning its slots over the interdigitated sector pins to define the preloaded condition. Relative motion between the first and second pins is inhibited until sufficient input torque is applied to the input member to overcome the preload. When the preload is thus overcome, relative motion between the input and output members of the power steering control apparatus permits conventional operation of the rotary control valve. When such relative motion occurs, the tangential force generated between opposing sides of the first and second pin sectors is applied to the tension spring ring while the other opposing sides of the first and second pin sectors move without restriction in elongated portion of their respective contoured slots.

The power steering control apparatus of the present invention includes a rotary control valve wherein a valve spool serves as the input member and a valve sleeve is coupled to the output member. More particularly, the valve sleeve is coupled to the pinion of a rack and pinion gear set by an Oldham coupling. The Oldham coupling is constructed as a disc-like member having precision formed pairs of first and second keys formed in its opposing face surfaces which engage slots formed in juxtaposed ends of the valve sleeve and pinion, respectively.

BRIEF DESCRIPTION OF THE DRAWINGS

The foregoing and other objects and advantages of the present invention will become readily apparent to those skilled in the art upon studying the following detailed description, when considered in connection with the accompanying drawings, in which:

FIG. 2 is a lateral sectional view of the preload mechanism shown in FIG. 1 for illustrating operation of the rotary control valve within a predetermined "preload" region;

FIGS. 3A and 3B are views, similar to FIG. 2, showing the operative association of the various components of the preload mechanism in response to clockwise and counterclockwise rotation, respectively, of the valve spool relative to the valve sleeve;

FIG. 4 is a plan view of the tension spring element of the preload mechanism shown in FIGS. 1 through 3B;

FIG. 6 is a view of the preload mechanism shown in FIG. 5 showing the components when operation of the control valve is confined to the predetermined preload region;

FIG. 7 is an exploded view of the preload mechanism shown in FIG. 5 having an Oldham coupling drive mechanism;

FIGS. 8A and 8B are views, similar to FIG. 6, depicting rotation in clockwise and counterclockwise directions, respectively, of valve spool relative to the valve sleeve following the preloaded condition being overcome;

FIGS. 9A and 9B are plan and side views, respectively, of the tension spring element of the preload mechanism shown in FIG. 6;

FIGS. 10A and 10B illustrate alternate means for incorporating the preload mechanism of FIG. 5 into the control apparatus;

DETAILED DESCRIPTION OF THE PREFERRED EMBODIMENT

Figure 1:
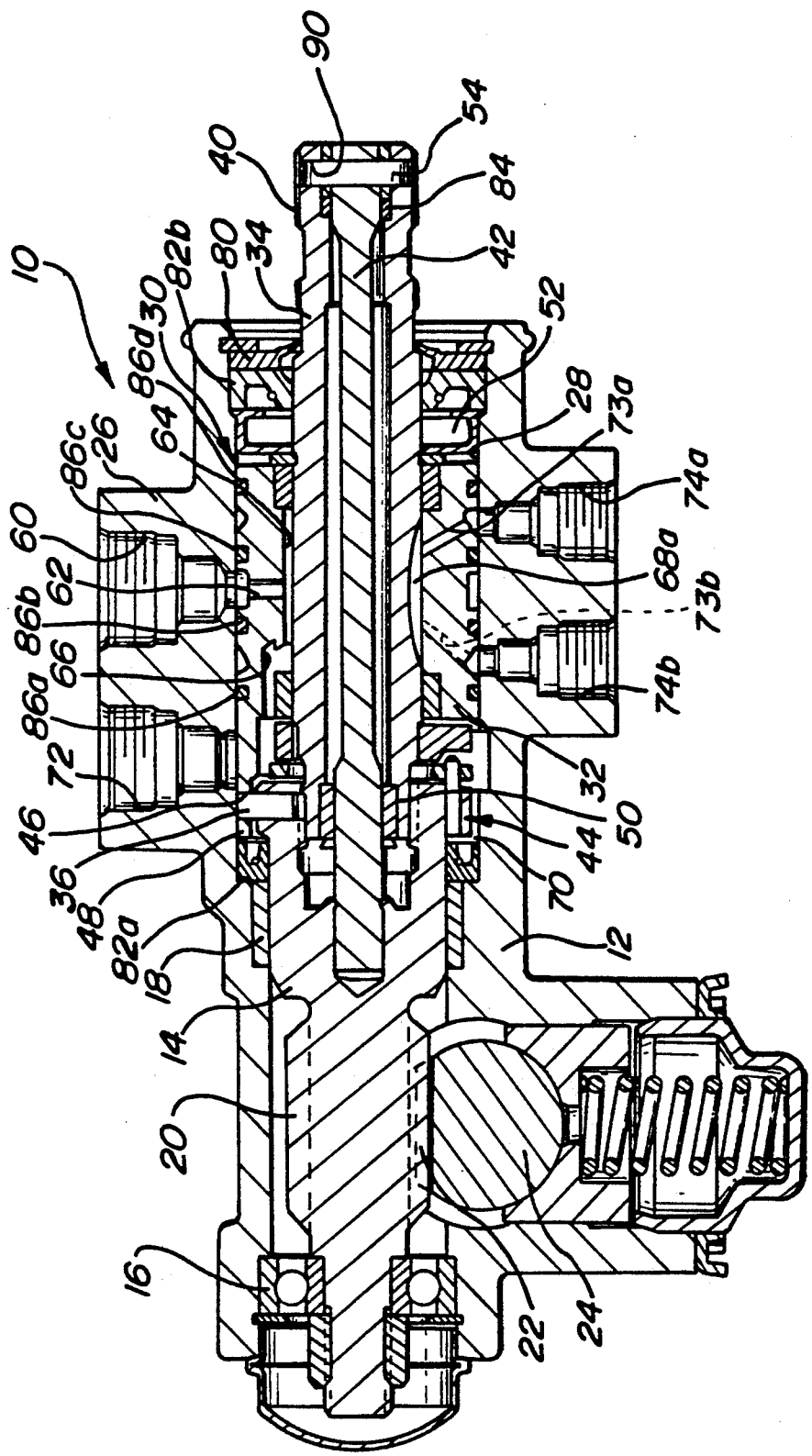
FIG. 1 is a longitudinal sectional view of an exemplary power steering control apparatus which incorporates an improved preload mechanism constructed in accordance with a first preferred embodiment of the present invention.

With particular reference to FIG. 1 of the drawings, an exemplary power steering control apparatus 10 of the type adapted for use in a vehicular power steering system is shown. Numeral 12 denotes a gear housing as a main body of the power steering system, in which a pinion shaft 14 is rotatably supported with its opposite ends being received through a pair of bearings 16 and 18. Pinion shaft 14 is meshed at its pinion portion 20 with a rack 22 of a rack shaft 24. Opposite ends of rack shaft 24 are connected with vehicle's steerable wheels through suitable steering link mechanisms, as is well known in the art. Further, rack shaft 24 is operably connected with a piston (not shown) of a hydraulic power cylinder (not shown) in a conventional manner.

Secured to gear housing 12 is a valve housing 26 provided with a valve chamber 28 in which a rotary control valve 30 is rotatably received. Rotary control valve 30 includes a valve sleeve 32 and a valve spool 34 received therein, which are rotatable with respect to each other about the longitudinal axis of pinion shaft 14. Valve sleeve 32 is connected to pinion shaft 14 through a connecting pin 36 for rotation therewith. Valve spool 34 is formed with an input portion 40 that is connectable to the vehicle's steering wheel (not shown), and valve spool 34 is elastically connected to pinion shaft 14 via a torsion bar 42, so that valve spool 34 is rotatable relative to the valve sleeve 32 within a limited angular extent.

As is known, "mechanically-derived" steering force is derived from the four-way control valve 30 upon input or steering torque being applied to rack shaft 24 via pinion portion 20 of pinion shaft 14. In accordance with the teaching of the present invention, rotary control valve 30 is equipped with a preload mechanism 44 that is operable for, in effect, mechanically interlocking valve spool 34 to valve sleeve 32 in response to steering torque being exerted on input portion 40 of valve spool 34 that is below a predetermined preload level. More particularly, preload mechanism 44 is operable for retaining valve spool 34 and valve sleeve 32 in their mechanically interlocked state (i.e., preventing relative rotation therebetween) until the input steering torque exceeds or "overcomes" the predetermined preload of preload mechanism 44. As such, when power steering control apparatus 10 is functioning within the preloaded operational region (i.e., below the predetermined preload value of preload mechanism 44), steering torque applied to valve spool 34 is directly coupled to pinion shaft 14 via preload mechanism 44. When input torque levels exceeding the preloaded operational region are applied to valve spool 34, preload mechanism 44 is overcome by the supplementally applied torque such that four-way control valve 30 becomes operational in a known manner for generating a "hydraulically-derived" steering force for augmenting the "mechanically-derived" steering force. The supplemental torque causes valve spool 34 to move rotationally with respect to valve sleeve 32.

Valve sleeve 32 is positioned within valve chamber 28 and is located axially and tangentially with respect to pinion shaft 14 by connecting pin 36 via hole 46 formed in axially extending tab 48 of valve sleeve 32. Valve spool 34 is located radially and in pitch and yaw by bearings 50 and 52, and axially by torsion bar 42 and drive pin 54. Valve sleeve 32 is located radially and in pitch and yaw by its interfacing fit upon valve spool 34.

The hydraulic elements of four-way rotary control valve 30 are configured in the exemplary embodiment shown in an "open-center" valving arrangement. However, it will be understood that preload mechanism 44 and its various alternative constructions to be disclosed hereinafter are also readily adapted for use in closed-centered valving arrangements. The pressurized source of hydraulic fluid supplied by the pump (not shown) enters four-way control valve 30 via a housing input port 60 and a plurality of radial input ports 62 formed in valve sleeve 32. The hydraulic fluid then flows between a identically numbered plurality of input slots 64 and return slots 66 that are laterally formed in alternating sequence about the inner peripheral surface of valve sleeve 32 via input and return orifices (not shown). As will be appreciated, the input and return orifices are located between input slots 64 and return slots 66, and alternately interspersed first and second sets of output slots 68a and 68b (not shown) are formed in the external peripheral surface of valve spool 34. Hydraulic fluid leaves four-way control valve 30 via return slots 66, a housing cavity 70 and a return port 72 to reservoir (not shown).

If valve spool 34 is rotated from its "centered" balanced position in a first direction (i.e., against the torsional resistance provided primarily by torsion bar 42), then the nominally free flow of hydraulic fluid is progressively restricted by closure of appropriate ones of the input and return orifices which, in turn, causes the fluid pressure to increase and be selectively applied between the first and second output slots 68a and 68b wherefrom it is applied to corresponding first and second ends of the double acting power cylinder (not shown) via first and second output bores 73a and 73b, respectively, first and second output ports 74a and 74b, respectively, and first and second output lines (not shown). As is known, the piston of the double acting power cylinder is coupled to rack shaft 24 which provides the "hydraulically-derived" steering assist in response to heavy steering loads. As will be appreciated by those skilled in the art, rotation of valve spool 34 from its "centered" position in an opposite direction against the torsional resistance of torsion bar 42 causes hydraulic fluid to flow in the opposite manner from that explained above. Again, the specific flow paths of control valve 30 are merely exemplary and are not intended to detract from the novelty of the improved preload mechanism 44 to be described hereinafter in greater detail.

Four-way control valve 30 is also shown to have a dust seal 80, fluid seals 82a and 82b, and O-ring seal 84 to keep dust out and hydraulic fluid in. Pressurized hydraulic fluid is confined to the appropriate ones of input port 60 and first and second output ports 74a and 74b, respectively, by ring seals 86a, 86b, 86c and 86d. One convenient method of forming input slots 64 and return slots 66 is by broaching. In that case, sealing rings 86 are utilized to seal off the terminal open ends of the slots.

As is known, four-way control valve 30 typically undergoes an operation called "balancing" during assembly wherein it is hydraulically (or pneumatically) activated for adjusting the axial and rotational positioning of valve spool 34 with respect to torsion bar 42 to define the "centered" position. Generally, during the "balancing" operation, valve spool 34 is clamped in a fixture which is positioned axially with respect to pinion shaft 14. The fixture is moved in clockwise and counterclockwise directions to positions until nominally identical fluid pressures are attained. In this manner, the centered position is determined and a hole 90 is formed through input end 40 of valve spool 34 and torsion bar 42. Thereafter, drive pin 54 is inserted into hole 90 to permanently couple the various active elements of four-way control valve 30.

With particular reference now to FIGS. 1 through 4, a first preferred construction of preload mechanism 44 is disclosed. In general, the "active" element of preload mechanism 44 is a tension spring ring 100 which is operably coupled to pinion shaft 14 by a first pair of pins 102a and 102b, and to a driving element 104 by a second pair of pins 106a and 106b. Preferably, driving element 104 is randomly positionable on valve spool 34 such that it may be fixedly clamped thereto after the "balancing" operation described above. It is necessary to allow this rotational degree of freedom in positioning driving element 104 in order to permit reasonable tolerances on each of the critical dimensions of the various parts described hereinabove and concomitantly locate preload mechanism 44 in its preloaded and centered position with respect to valve sleeve 32 and valve spool 34 of balanced four-way valve 30. More particularly, each of first pins 102a, 102b are secured to pinion shaft 14 so as to project axially toward valve sleeve 32. First pins 102a and 102b are shown in FIG. 2 to project through and be retained within a first pair of contoured slots 108a and 108b, respectively, that are formed in symmetrical relation on opposite terminal ends 110a and 110b, respectively, of C-shaped tension spring ring 100. As shown in FIG. 4, in a relaxed state, the centerline of slots 108a, 108b is located at a second radius that is located radially outward of the first radius of first pins 102a, 102b. As such, ends 110a, 110b of spring ring 100 must be compressed together to locate first pins 102a and 102b within first slots 108a and 108b, respectively. In addition, first contoured slots 108a and 108b are shown to each include an arcuate seat portion 112a and 112b, respectively, and enlarged portions 114a and 114b, respectively. In the "centered" and preloaded position of FIG. 2, tension spring ring 100 is preloaded such that first pin 102a is received within seat portion 112a and first pin 102b is received within seat portion 112b.

Second pins 106a and 106b are secured to drive element 104 such that they project axially toward pinion shaft 14. Furthermore, second pins 106a and 106b are located at the first radius so as to be circumferentially aligned with first pins 102a and 102b. Second pins 106a, 106b are shown to project through and be retained within a second pair of contoured slots 116a and 116b, respectively, also formed in symmetrical relation on opposite terminal ends 110a and 110b, respectively, of C-shaped spring ring 100 and are formed at the second radius so as to be circumferentially aligned with first slots 108a, 108b in the relaxed state. As can be seen, second slots 116a and 116b are located outboard of first slots 108b and 108a, respectively. In addition, second slots 116a and 116b each include a seat portion 118a and 118b, respectively, and an elongated portions 120a and 120b, respectively. In the "centered" position of FIG. 2, second pins 106a and 106b are seated within seat portions 118a and 118b, respectively, due to the preload exerted by tension spring ring 100.

With reference now to FIGS. 3A and 3B, preload mechanism 44 is shown deflected from the FIG. 2 "centered" position in clockwise and counterclockwise directions, respectively. When the steering torque applied to spool 34 exceeds the predetermined preload applied by spring 100, valve spool 34 can be deflected relative to valve sleeve 32. In the clockwise direction shown in FIG. 3A, concurrent deflection of driving element 104 causes second pin 106a to urge spring ring 100 against first pin 102a via seat 118a of contoured slot 116a and seat 112a of contoured slot 108a, respectively. Such relative rotation, causes spring ring 100 to further compress whereby pins 106b and 102b are permitted to move off of seats 118b and 112b, respectively, and into enlarged portions 120b and 114b, respectively, of contoured slots 116b and 108b, respectively. Conversely, when preload mechanism 44 is deflected in the counterclockwise direction shown in FIG. 3B, second pin 106b drives spring ring 100 against first pin 102b via seat 118b of contoured slot 116b and seat 112b of contoured slot 108b, respectively. Such action also causes tension spring ring 100 to further compress whereby second pin 106a and pin 102a lift off of seat 118a of contour slot 116a and seat 112a of contour slot 108a, respectively, and into enlarged portions 120a and 114a, respectively.

With reference now to FIG. 4, a preferred construction of C-shaped tension spring ring 100 is shown. A preferred method of fabricating spring ring 100 is similar to that utilized in the fabrication of retaining rings. The general outline of spring ring 100 and elongated contoured slots 116a, 116b, 108a and 108b are usually formed in a blanking and perforating operation. A preferred material from which spring ring 100 is fabricated is beryllium copper in its annealed condition. After precipitation hardening, seats 118a, 118b, 112a and 112b are formed in a precision boring operation.

With reference again to FIGS. 1 and 2, driving element 104 is shown to include a radial slot 130 and a flexible section 132 so that drive element 104 may readily be clamped on valve spool 34 by screw 134 following the balancing process. In addition, driving element 104 is formed with radially extending load bearing surfaces 136a and 136b, and clamping surface 138 on its interior peripheral surface. Load bearing surfaces 136a and 136b are formed relative to each other at angular positions approximately +/−45 degrees from a radial plane passing through clamping surface 138. Thus, load bearing surfaces 136a and 136b comprise a "vee-block" type mounting reference in near proximity to first pins 106a and 106b, respectively.

Figure 5:
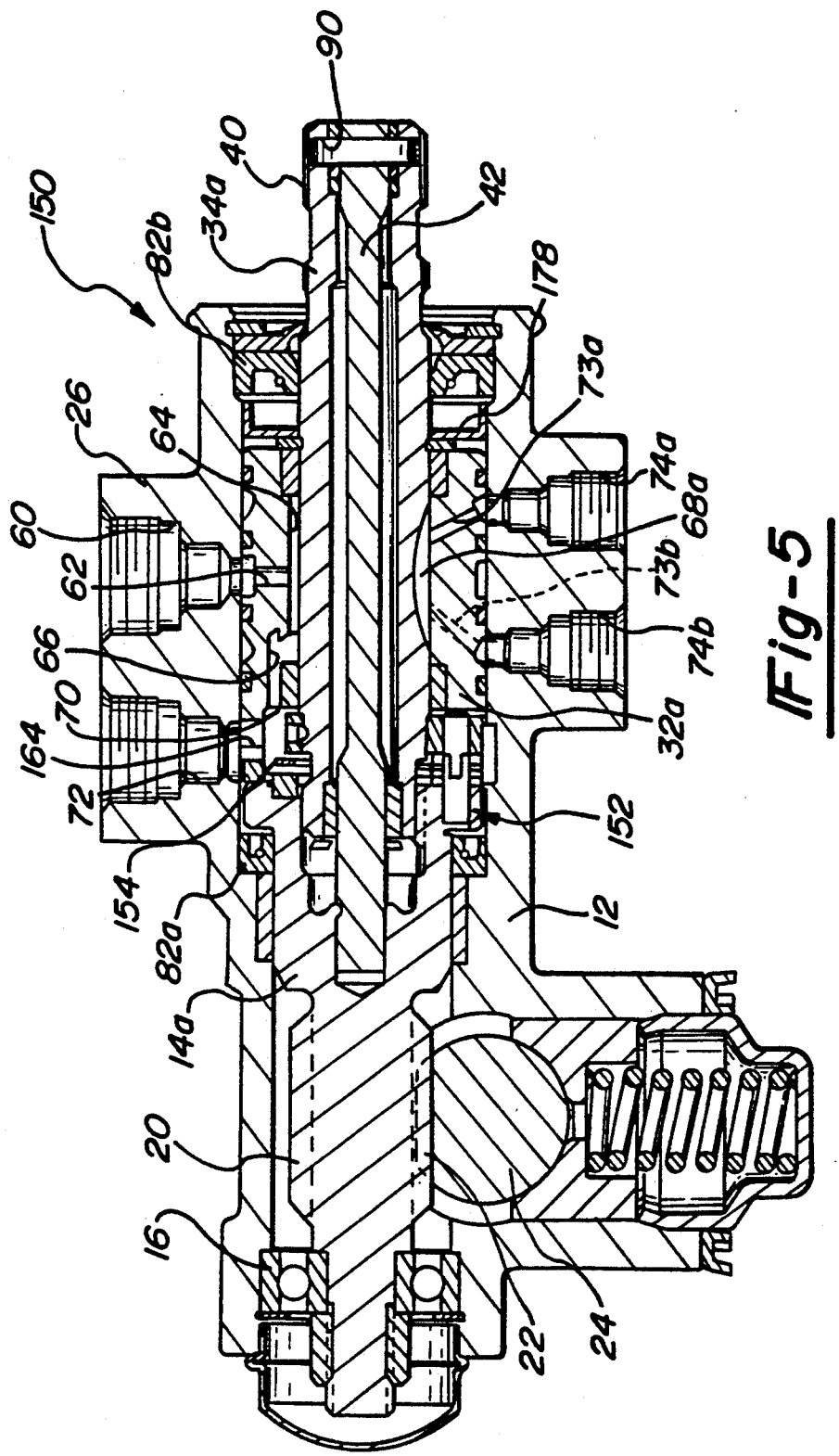
FIG. 5 is a longitudinal sectional view of an exemplary power steering control apparatus which incorporates a preload mechanism constructed in accordance with a second embodiment of the present invention.

With reference now to FIGS. 5 through 7 of the drawings, another exemplary power steering control apparatus 150 is shown which incorporates a preload mechanism 152 constructed according to an alternative embodiment of the present invention. Preload mechanism 152 differs from preload mechanism 20 in that spring ring 154 has only one pair of contoured slots 156a and 156b that are formed on legs 110a and 110b, respectively. Slots 156a and 156b are partially alignable when spring ring 154 is compressed such that interdigitated first and second pin sectors 160a and 160b, respectively, project through and are retained therein. Pin sectors 160a are mounted to pinion shaft 14a and pin sectors 160b are mounted to driving element 162. The hydraulic function and testing of the power steering control apparatus 150 is substantially identical to that explained above with respect to the power steering control apparatus 10. (And all identical details have the same numbers or if functionally similar but have numbers with the suffix "a"). However, driving element 162 is welded to valve spool 34 after the "balancing" operation. This can be done either by electron beam or laser welding techniques with access through via hole 164 in valve sleeve 32a.

As an additional feature of the present invention, an exploded view of power steering control apparatus 150 is shown in FIG. 7 to include an Oldham coupling 166. Oldham coupling 166 is utilized for linking valve sleeve 32a to pinion shaft 14a for rotational movement therewith in place of connecting pin 36. The driving action of Oldham coupling 166 is functionally superior to that provided by single connecting pin 36 and hole 46 because it only transmits torque while torque transmitted by connecting pin 36 also results in exertion of lateral forces upon bearings 18 and 50 as well as the interfacing fit between valve sleeve 32 and valve spool 34. Such lateral forces cause rotational friction and extra tangential displacement between valve sleeve 32 and valve spool 34, both of which contribute to unwanted hysteresis in control valve action. Further, tab 48 of valve sleeve 32 utilized in the preload mechanism 44 is eliminated for further simplifying the detail design of all components.

A first pair of diametrically opposed keys 168 of Oldham coupling 166 are driven by corresponding slots 170 formed in radial face 172 of pinion shaft 14a. A second set of diametrically opposed keys 174 on Oldham coupling 166 drivingly engage corresponding slots 176 formed in radial face 178 of valve sleeve 32a. As with all Oldham couplings, rotational drive is substantially accomplished without the transmission of any lateral forces. This is because one lateral degree of freedom is provided by the slidable interface between first keys 168 and first slots 170 and the other is provided by the slidable interface between second keys 174 and second slots 176. As best seen in FIG. 5, valve sleeve 32a is axially restrained by retaining ring 178. This is an additional function for retaining ring 178 which is normally utilized only to provide axial retention of valve spool 34 in the unlikely event of mechanical failure of torsion bar 42.

With reference to FIG. 6, preload mechanism 152 is shown in its "centered" position with overlapping seat portions of slots 156a, 156b of spring ring 154 applying a tensile preload on interdigitated pin sectors 160a and 160b such that their opposite ends are retained tightly within aligned seat portions 180a and 180b of contoured slots 156a and 156b, respectively. In this condition, relative rotation between valve sleeve 32a and valve spool 34 is precluded due to the tensile loading exerted on interdigitated sector pins 160a and 160b until steering torque exceeding the preload threshold of spring ring 154 is applied to valve spool 34.

With particular reference now to FIGS. 8A and 8B, preload mechanism 152 is shown deflected in clockwise and counterclockwise directions, respectively, from its "centered" position of FIG. 6. When preload mechanism 152 is deflected in a clockwise direction in response to sufficient input torque being applied to valve spool 34 for overcoming the preload of spring ring 154, rotation of valve spool 34 causes pin sector 160a to drive spring ring 154 against pin sectors 160b via seat 180a of oblong slot 156a and seat 180b of oblong slot 156b, respectively. This action causes further compression of spring ring 154 whereby first and second pin sectors 160a and 160b lift off from ends 180b and 180a, respectively, of oblong slots 156b and 156a, respectively. Conversely, when preload mechanism 152 is deflected in a counterclockwise direction, pin sector 160a drives spring ring 154 against pin sector 160b via seat 180b of oblong slot 156b and seat 180a of oblong slot 156a, respectively. This also causes spring ring 154 to further compress whereby pin sectors 160a and 160b lift off from seats 180a of oblong slot 156a and 180b of oblong slot 156b, respectively.

With reference now to FIGS. 9A and 9B, spring ring 154 is shown in greater detail. Again a preferred method of fabricating spring ring 154 is similar to that utilized in the fabrication of common retaining rings and the general fabrication procedure is similar to that explained above with respect to spring ring 100. However, spring ring 154 is additionally formed in a generally helical manner to provide axial clearance for overlapping tangential compression during assembly onto interdigitated pins 160a, 160b. Further, ends 182a and 182b of spring ring 154 are formed in a counter-helical manner to preclude axial closure of surfaces 184a and 184b upon further tangential closure during operation as described above. This also serves to locate ends 180a and 180b with axial spacing from driving element 162 and Oldham coupling 166, respectively.

With reference to FIGS. 10A and 10B, alternate driving elements 200 and 204 are shown that are similar to driving element 162. However, driving element 200 does not rely upon an actual welded joint for rotation with valve spool 34a because valve spool 34a is formed with a depression 206 into which a slumping portion 208 of driving element 200 depresses upon heating to a molten state (i.e., via laser heating). In this case the laser is pointed downward and gravitational force is used to depress the slumping portion 208 to interlock with depression 206. Alternately, driving element 204 is secured to valve spool 34b via dog-point set screws 210a and 210b. The dog-point set screws 210a and 210b differentially bear against flat-bottomed lateral depressions 212a and 212b, respectively, formed in valve spool 34b. Access to the dog-point set screws 210a and 210b is obtained via holes 214a and 214b, respectively, which are formed in valve sleeve 32b.

With particular reference now to FIGS. 11 through 13B, another embodiment of a preload mechanism 344 is disclosed. In general, the "active" element of preload mechanism 344 is a tension spring 300 which is operably coupled to pinion shaft 14 by a first pair of pin sectors 302a and 302b and to driving element 304 by a second pair of pin sectors 306a and 306b. Preferably, driving element 304 is randomly positionable on valve spool 34 such that it may be fixedly secured thereto after the balancing operation described above by any of the methods described above or any other methods known in the art. As described above, it is necessary to allow this rotational degree of freedom in positioning driving element 304 in order to permit reasonable tolerances on each of the critical dimensions of the various parts described hereinabove and concomitantly locate preload mechanism 344 in its preloaded and centered position with respect to valve sleeve 32 and valve spool 34 of the balanced four-way valve.

Figure 11:
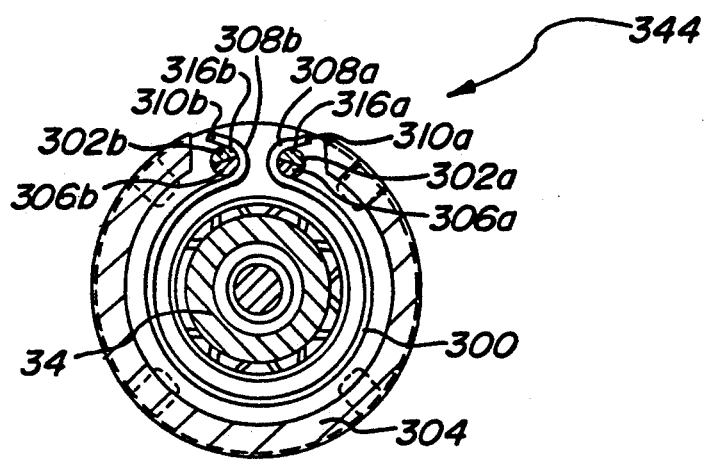
FIG. 11 is a lateral sectional view of a preload mechanism for illustrating operation of the rotary control valve within a predetermined preload operation in accordance with another embodiment of the present invention.

More particularly, each of the first pin sectors 302a and 302b are secured to pinion shaft 14 so as to project axially toward sleeve 32. Each of the second pin sectors 306a and 306b are secured to driving element 304 so as to project axially toward pinion shaft 14. Pin sectors 302a and 306a mate with each other to form a first generally cylindrical pin 316a. Similarly, pin sectors 302b and 306b mate with each other to form a second generally cylindrical pin 316b. First and second pins 316a and 316b are shown in FIG. 11 to project adjacent to and in contact with a pair of contoured hooks 308a and 308b, respectively, that are formed in symmetrical relation on opposite terminal ends 310a and 310b respectively of C-shaped tension spring ring 300. The outside diameter of first and second pins 316a and 316b is approximately equal to the inside diameter of hooks 308a and 308b, respectively.

In a relaxed state, the centerline of the inside radius of hooks 308a and 308b is located radially outward of the radius of the centerline for first and second pins 316a and 316b. As such, ends 310a and 310b of spring ring 300 must be compressed together to locate first and second pins 316a and 316b within the hooks 308a and 308b, respectively.

Figure 12A:
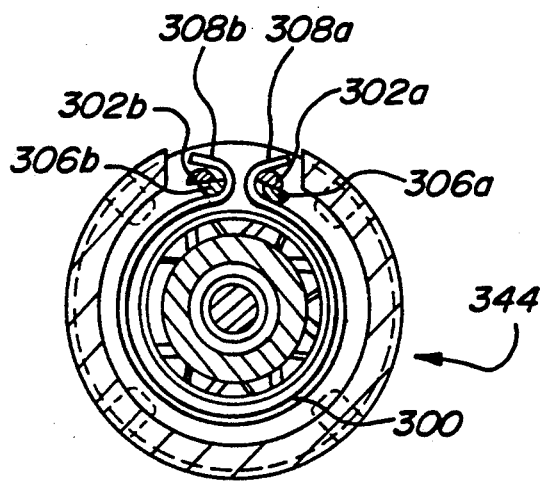
FIG. 12A and 12B are views, similar to FIG. 11, showing the operative association of the various components of the preload mechanism in response to clockwise and counterclockwise rotation, respectively, of the valve spool relative to the valve sleeve.
Figure 12B:
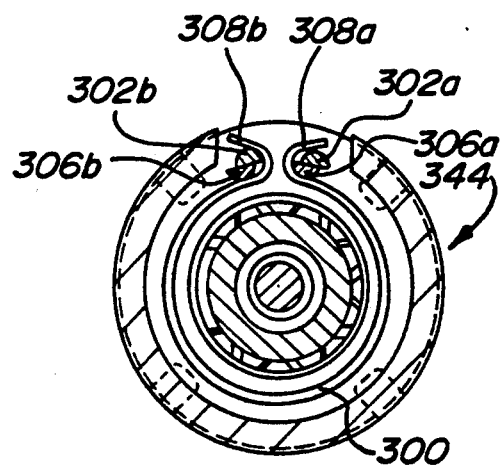

With reference now to FIGS. 12A and 12B, preload mechanism 344 is shown deflected from the FIG. 11 "centered" position in clockwise and counterclockwise directions, respectively. When the steering torque applied to spool 34 exceeds the predetermined preload applied by spring 300, valve spool 34 can be deflected relative to valve sleeve 32. In the clockwise direction shown in FIG. 12A, concurrent deflection of driving element 304 causes second pin sector 306b to urge spring ring 300 against first pin sector 302a via the internal radius of hooks 308a and 308b respectively. Such relative rotation causes spring ring 300 to further compress whereby pin sectors 306a and 302b are permitted to move out of contact with hooks 308a and 308b, respectively. Conversely, when preload mechanism 344 is deflected in the counterclockwise direction as shown in FIG. 13B, second pin sector 306a drives spring ring 300 against first pin sector 302b via the internal radius of hooks 308a and 308b, respectively. Such action also causes tension spring ring 300 to further compress whereby second pin sector 306b and first spring sector 302a move out of contact with hooks 308b and 308a, respectively.

Figure 13:
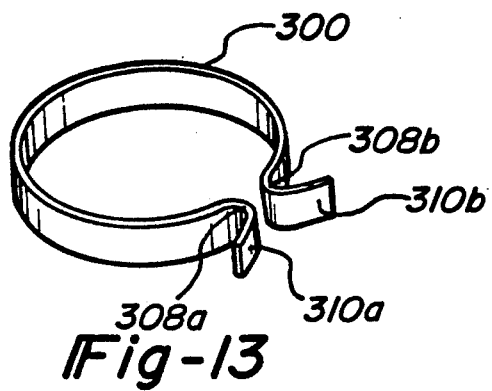
FIGS. 13 is a perspective view of the tension spring element of the preload mechanism shown in FIGS. 11 through 12B.

With reference now to FIG. 13, a preferred construction of C-shaped tension spring ring 300 is shown. The method of fabricating spring ring 300 is similar to methods utilized in the fabrication of retaining rings and is well known in the art.

The foregoing discussion discloses and describes merely exemplary embodiments of the present invention. One skilled in the art will readily recognize from such discussion, and from the accompanying drawings and claim, that various changes, modifications and variations can be made therein without departing from the true spirit and fair scope of the invention as defined in the following claims.

What is claimed is:

1. A rotary control valve comprising:
   an input member adapted to receive input torque applied thereto, said input member having a first pair of spaced apart pins extending therefrom;
   an output member having a second pair of spaced apart pins extending therefrom; and
   a preload mechanism including tension spring for operable coupling said input member to said output member, said tension spring being partially compressed when in a neutral position where no torque is being applied to said input member, said tension spring having a pair of engagement portions, each engagement portion abutting one pin of said first and second pairs of spaced apart pins, said first pair of pins movable with respect to said second pair of pins whereby said tension spring is further compressed when input torque is applied to said input member.

2. The rotary control valve of claim 1 wherein said output member comprises:
   a pinion shaft;
   a valve sleeve coupled to said pinion shaft by an Oldham coupling; and
   wherein said preload mechanism couples said input member to said pinion shaft.

3. The rotary control valve of claim 2 wherein said input member is a valve spool rotatably disposed within said valve sleeve.

4. The rotary control valve of claim 1 wherein said tension spring comprises a C-shaped ring.

5. The rotary control valve of claim 4 wherein said C-shaped ring is formed with a hook at each end.

6. The rotary control valve of claim 4 wherein said C-shaped ring is rectangular in cross section.

7. A rotary control valve comprising:
   a valve housing;
   a valve sleeve rotatably disposed within said valve housing;
   a valve spool rotatably disposed within said valve sleeve; and
   a pinion shaft rotatably connected to said valve sleeve by an Oldham coupling.

8. The rotary control valve of claim 7 further comprising:
   a preload mechanism including tension spring means for operably coupling said valve spool to said valve sleeve; said output member having at least one first pin;
   said valve spool having at least one second pin; and
   said Oldham coupling having at least one aperture for accepting said at least one first pin and said at least one second pin.

9. The rotary control valve of claim 8 wherein said tension spring means comprises a C-shaped ring.

* * * * *